UNITED STATES PATENT OFFICE.

KARL SCHAEFER, OF CHARLOTTENBURG, GERMANY, ASSIGNOR TO BERLIN-ANHALTISCHE MASCHINENBAU-AKTIEN-GESELLSCHAFT, OF BERLIN, GERMANY, A CORPORATION OF GERMANY.

MANUFACTURE OF HYDROGEN.

1,172,908.     Specification of Letters Patent.     Patented Feb. 22, 1916.

No Drawing.     Application filed May 16, 1914. Serial No. 839,104.

*To all whom it may concern:*

Be it known that I, KARL SCHAEFER, a citizen of the Empire of Germany, and a resident of Charlottenburg, Germany, have invented certain new and useful Improvements in the Manufacture of Hydrogen, of which the following is a specification.

My invention relates to a process for the manufacture of hydrogen, in which heated iron is alternately reduced and oxidized by alternate passing of reducing gas and steam.

In carrying out this process I have found that it is open to the serious drawback that the reaction capacity of the iron is greatly reduced by impurities contained in the heating gas used for heating the iron, and in the reduction gas. These impurities chiefly consist of dust, particles of carbon and sulfur compounds, which settle on the iron.

It has been already attempted to prevent the impurities from settling on the iron, by using indirect instead of direct heating. For reasons of economy and of convenience of working, however, direct heating of iron is undoubtedly preferable to indirect heating.

My invention is based on the fact that the number of impurities on the iron will increase, the greater the quantity of the heating and reducing gas required for carrying out the process. In order to do with the smallest possible quantities of heating and reducing gas, only gases of very high heating and reducing power are used according to this invention, in such a manner that the heating gas used is burnt, during the first heating of the iron, with an excess of air.

It has been already suggested to use gas of great heating power, such as for instance water gas for the direct heating of iron in hydrogen manufacture, but it has not been hitherto discovered that the combustion of such heating gas must take place with an excess of air, in order to avoid serious technical drawbacks. If such a heating gas, for instance water gas, is burnt for the direct heating of iron, with only the quantity of air theoretically sufficient, local superheating is easily produced in the gas generator, which results in a sintering of the pieces of iron with which the flame first comes into contact. The sintering of the iron not only renders more difficult the emptying of the furnace shaft, which must be done from time to time, but also damages the furnace lining and further reduces the yield of gas, as the surface of iron alternately coming into contact with the reducing gas and the steam, is considerably reduced by the sintering of the mass.

According to my invention, for the purpose of avoiding the drawbacks in question, the gas of great heating power is burnt, during the first heating of the iron, with an excess of air as to insure a perfectly uniform heating of the iron charge. As the heating gas, water gas is preferably employed, this requiring for its complete combustion 2.4 times its volume of air. If however, water gas is burned in the generator and this proportion of air is exactly maintained, local superheating results, with the adverse consequences above described. If on the other hand in accordance with my invention an excess of about 25% over the theoretically correct quantity of air is used, *i. e.*, three cubic meters of air to one cubic meter of water gas, local superheating is avoided and the charge of iron is heated in a uniform manner. Such an excess of air has a further advantageous effect in that the particles of carbon and sulfur compounds carried by the heating gas are thus burnt and rendered harmless. A greater excess of air further improves the uniformity of heating of the charge of iron.

The powerful heating or reducing gas for carrying out the process is obtained either direct from a gas generator, or from a gas holder of any desired kind. In the first case, the heat of the gas itself is utilized in the shaft containing the iron, whereby the economy of the process is increased.

Another feature of my invention is as follows: As proved by experiments, a complete oxidation of the iron by the steam passed over it practically never takes place. Even after a long passing of excess of steam, there is still left in the iron charge, some iron in a metallic state or in a low stage of oxidation. If, after the steam, a current of air is passed through the mass this residue of metallic iron or of low oxid of iron is oxidized completely to a higher degree of oxidation, considerable quantities of heat being released. These quantities of heat have been found entirely sufficient for maintaining the process in normal working.

Consequently the process is carried out according to this invention by effecting only the first heating of the iron by means of a combustion of powerful heating gas with an excess of air, while for the periodic heating up of the iron air alone is used which is passed through the iron. Experiments have shown that the working can be maintained in this manner for several days. By heating up the iron by means of the air alone, the main purpose of the process, namely the prevention of dirt in the iron, is also promoted, as during the heating period gas never gets to the iron at all, and moreover any deposit of carbon or sulfid of iron formed during the reduction period, is burnt.

The efficiency of the process can be further increased by using highly superheated steam during the oxidation period.

What I claim is:—

The process of producing hydrogen by alternately reducing and oxidizing heated iron by the alternate passing of reducing gas and steam, which consists in directly heating the iron in the first stage by means of a heating gas supplied in the presence of air in excess, and, during the following stages of alternately heating the iron with a reducing gas and steam, periodically reheating the iron exclusively by passing air in contact with it.

In testimony whereof, I have signed this specification in the presence of two subscribing witnesses.

KARL SCHAEFER.

Witnesses:
 HENRY HASPER,
 ARTHUR SCHROEDER.